United States Patent

Hall et al.

[11] Patent Number: 5,721,554
[45] Date of Patent: Feb. 24, 1998

[54] NEAR FIELD PLANAR WAVE GENERATION FOR ELECTRONIC RANGE TESTING

[75] Inventors: Stanley R. Hall, Clifton, Va.; Donald E. Bostrom, Sherman Oaks; David C. Sjolund, Redondo Beach, both of Calif.

[73] Assignee: Hughes Electronics, Los Angeles, Calif.

[21] Appl. No.: 771,076

[22] Filed: Dec. 20, 1996

[51] Int. Cl.$^6$ ................................................. G01S 7/40
[52] U.S. Cl. .......................... 342/165; 342/169; 342/170; 342/171; 342/172
[58] Field of Search ................................ 342/165, 170, 342/169, 171, 172

[56] References Cited

U.S. PATENT DOCUMENTS

| | | | |
|---|---|---|---|
| 5,247,843 | 9/1993 | Bryan | 73/865.6 |
| 5,319,375 | 6/1994 | Gallegro et al. | 342/165 |
| 5,339,087 | 8/1994 | Minarik | 342/375 |
| 5,534,873 | 7/1996 | Weichman et al. | 342/165 |
| 5,572,219 | 11/1996 | Silverstein et al. | 342/375 |

*Primary Examiner*—John B. Sotomayor
*Attorney, Agent, or Firm*—Leonard A. Alkov; Wanda K. Denson-Low

[57] ABSTRACT

A near field planar wavefront generation method that uses a relatively small number (three to five) of transmitting antennas disposed a predetermined distance from an antenna array having a multi-wavelength aperture that is part of a system under test. The method creates a synthesized one-dimensional linear planar wavefront of radiation over at least ten wavelengths for testing the antenna array of the system under test. The planar wavefront is formed at a specific frequency and at predetermined distance from the transmitting antennas, typically in the range of from 100 to 200 feet. The transmitting antennas synthesize a plane wave with linear phase progression to simulate tilt variations. To achieve this, electromagnetic energy signals emitted by the respective transmitting antennas are amplitude and phase weighted to synthesize the one dimensional linear plane wave to produce a combined wavefront having a linear phase front across the aperture of the antenna array of the system under test. Additionally, the phase and amplitude weighting may be changed to fit the linear wavefront made incident upon the antenna array 15 of the system under test.

4 Claims, 2 Drawing Sheets

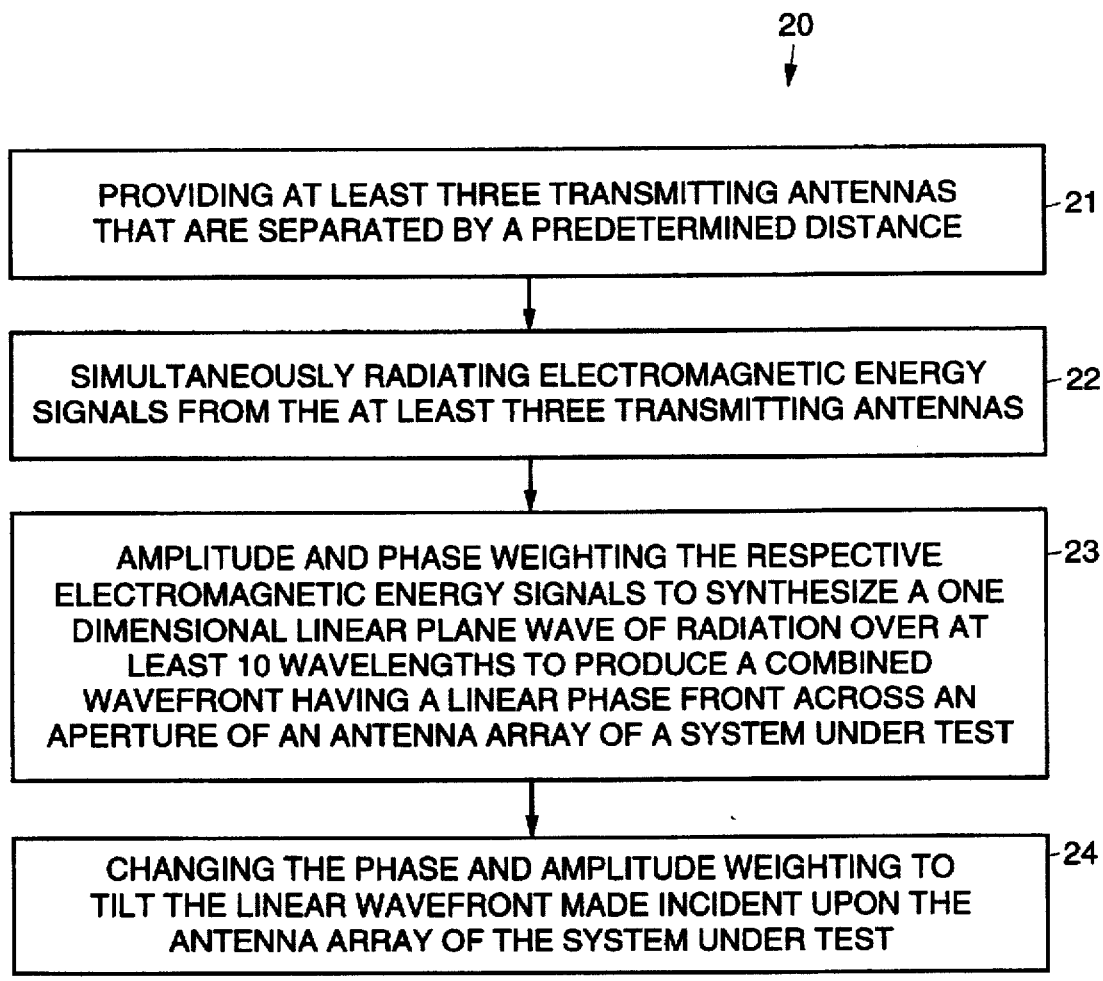

NEAR FIELD PLANAR WAVE GENERATION FOR ELECTRONIC RANGE TESTING

BACKGROUND

The present invention relates generally to electronic range testing, and more particularly, to a near field planar wavefront generation technique that may be used in electronic test ranges to test precision (<2°) angle of arrival antenna measurement systems, and to permit multiple tests to be conducted at the same time.

Prior methods of creating plane waves for testing interferometry arrays and the like in relatively small chambers include direct injection at the antennas or the creation of a large curved billboard aperture. The billboards must be very large structures to meet the requirements in most ranges. Direct injection involves expensive, complex coupling hardware that physically and electronically couples to the tested interferometry system and poses potential electromagnetic interference (EMI) to other antenna systems or electromagnetic coupling (EMC) problems. The curved billboard array technique uses a very large radiating aperture which suffers from size inflexibility, range reflection errors and high costs.

Curved billboard-type arrays are only capable of a single function test, since the curvature is distance and frequency dependent. Direct injection techniques are not limited to single function testing. However, both the curved billboard and direct injection technique are more complex, more expensive, less mobile and less useful than the present invention.

Accordingly, it is an objective of the present invention to provide for a near field planar wavefront generation technique for use in electronic test ranges for use in testing antenna measurement systems, and that permits multiple tests to be conducted at the same time, since minimal EMI is created.

SUMMARY OF THE INVENTION

To meet the above and other objectives, the present invention provides for a near field planar wavefront generation technique that uses a relatively small number (three to five) transmitting antennas to create a synthesized one-dimensional linear plane of radiation over 10 to 20 wavelengths at a specific location on an antenna array of a system under test at a specific frequency and distance, typically in the range of from 100 to 200 feet. The transmitting antennas synthesize a plane wave and also a linear phase progression to simulate angle of arrival variations. The effects are created by radiating the correct amplitude and phase RF signal at each transmitting antenna at the correct time.

The present method generates a plane wave for testing a system under test having an antenna array with a multi-wavelength aperture. The method includes the following steps. At least three transmitting antennas are disposed a distance less than 250 feet from the antenna array of the system under test. Electromagnetic energy signals are simultaneously radiated from the three transmitting antennas. The respective electromagnetic energy signals are amplitude and phase weighted to synthesize a one dimensional linear plane wave of radiation over at least 10 wavelengths to produce a combined wavefront having a linear phase front across the aperture of the antenna array of the system under test. Also, the phase and amplitude weighting may be changed to tilt the linear wavefront made incident upon the antenna array of the system under test and change the angle of arrival a few degrees.

The near field planar wave generation technique provide a flexible, versatile and low cost system that may be used to verify the performance of interferometry arrays of a system under test that is enclosed in an anechroic chamber and/or other relatively short antenna range. The present invention does not create electromagnetic interference or electromagnetic coupling problems and utilizes less hardware than other prior techniques. The present invention uses a finite (typically 3 to 5) set of sources (antennas) to radiate a field at the system under test.

The present invention also provides a flexible, versatile system to verify the performance of radar tracking antennas on a system under test that is enclosed in an anechroic chamber and/or other relatively short antenna range. A typical radar system tracks targets with fractions of a milliradian angular accuracy. With the wavefront tilt control provided by the present invention, targets can be generated with very precise angular accuracy to test the radar angular tracking accuracy. This capability does not require adding extra hardware to the range, but increases the target simulation capability of the system.

The present invention may be used in any commercial or military anechroic chamber or antenna range as a useful measurement tool to expand the capability of the range facility to verify interferometry arrays used in situation awareness systems on aircraft or radar angular accuracy testing on aircraft. Furthermore, the present invention allows multiple tests to be conducted at the same time, since EMI is minimized.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 7 is a flow diagram illustrating one method in accordance with the principles of the present invention.

DETAILED DESCRIPTION

To create plane waves for a system under test 11 (FIG. 2) that feature a precision angle of arrival measurement capability of 1° or less, special considerations are required. For these applications, the interferometer angle of arrival measurement or array beam steering control of the system under test 11 is based upon the assumption that a plane wave is incident upon a multi-wavelength aperture of an antenna array 15 (FIG. 2) of the system under test 11. For operation at relatively short ranges, on the order of less than 250 feet which is typical in small test ranges, the wavefront is curved, creating a distortion of the phase front across the array 15, creating errors in the performance of the antenna array 15 of the system under test 11.

Figure 1:
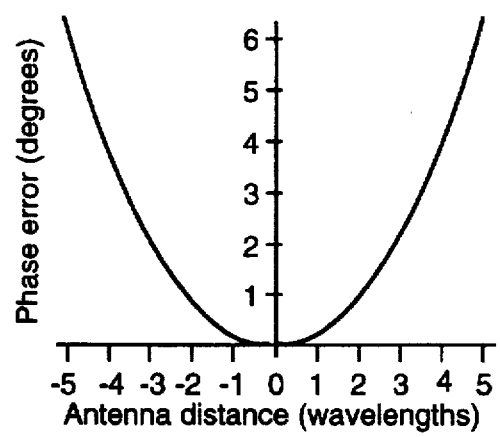
FIG. 1 shows the effect of wavefront curvature of >0.05° over 10λ at 125 feet from a single antenna.

The effect of wavefront curvature of >5° over 10λ at 125 feet from a single transmitting antenna 13 (FIG. 2) is depicted in FIG. 1. A phase distortion of less than 1° over 10 wavelengths is typically required for an interferometer system to produce precise angle of arrival angular data. An estimate of the phase distortion across the array 15 based upon representative conditions is given below.

Given an array size of 10 wavelengths, and a system phase match budget for the system under test 11 of 10°, and an allowed test chamber phase distortion of 1°. The path length difference ΔR of the array 15 is given by the equation $$\Delta R = \sqrt{R_g^2 + l^2} - R^2 = R_g \sqrt{1 + \left(\frac{l}{R_g}\right)^2} - R^2 =$$

$$R_g \cdot \left(1 + \frac{1}{2}\left(\frac{l}{R_g}\right)^2\right) - R_g = \frac{1}{2} \frac{l^2}{R_g}$$

where $R_g$ is the range from the transmitting antenna 13 to the system under test 11. 1 is the aperture size. Therefore, if $l=10\lambda$ and $\Delta R=1/360\lambda$ for 1° phase front linearity, then $$R_g = [360 \cdot (10\lambda^2)]/\lambda = 36,000\lambda.$$

This relationship indicates that the lower the frequency of operation, the longer the wavelength, and the greater the chamber range needs to be. However, for many airborne applications, for example, the size of the antenna array 15 is fixed for full performance at approximately 6 GHz. At lower frequencies, reduction of the electrical size of the array 15 is allowed, with corresponding performance degradation. Therefore, the worst case condition is likely to be encountered at 6 GHz. For this condition, the needed transmission range, given a 10 wavelength antenna aperture, with λ=c/f=30/6 cm=0.16 feet, is given by $$R_g = 36,000 \cdot 0.16 = 5900 \text{ feet.}$$

Since this range value is well beyond most practical test range dimensions, an alternative method for providing linear phase fronts is required, and is provided by the present invention. The present invention is described in detail below.

Figure 2:
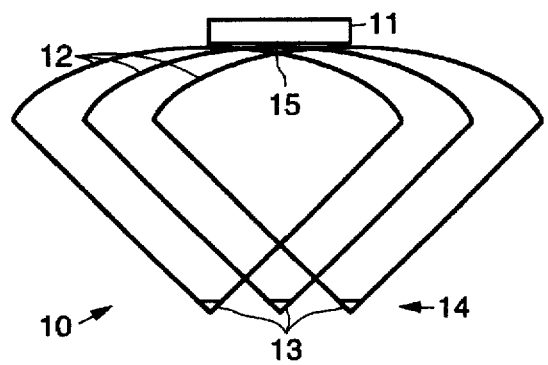
FIG. 2 illustrates vector solutions for synthesizing a near field planar wavefront in accordance with the principles of the present invention.

Referring to FIG. 1, it shows the phase front at a distance of 125 feet from a single transmitting antenna 13 (FIG. 2). As discussed previously, distortion of less than 1° over 10 wavelengths is required to produce precise angle of arrival data. FIG. 2 shows a test arrangement 10 in which the present invention is used and illustrates vector solutions generated by the present invention that synthesize a planar wavefront that is made incident upon a system under test 11. The present invention simultaneously radiates electromagnetic energy signals from at least three (typically three to five) transmitting antennas 13.

The radiation pattern created by a multiple antenna transmitting array 14 may be calculated by first finding the contribution made from each transmitting antenna 13 of the multiple antenna array 14 and then summing them using the principle of superposition. Thus, the electromagnetic field created by each transmitting antenna 13 must be calculated at each point along a test line in space. Once this is done, the fields can be added. However, in order to simplify the addition process, the fields are first transformed from a spherical to a rectangular coordinate system.

The phase variation along the test line can be minimized by adjusting magnitude and phase of the feed values. To guarantee a minimum phase variation (within a desired tolerance margin) a computer program is used. The implemented optimization procedure embodied in the program minimizes the phase variation of the electric field over a specified distance region by iteratively adjusting the magnitude and phase of the feed coefficients. The process is based on the use of a built-in MATLAB® optimizer and this programmed function returns the maximum phase error on the test surface using a model of the transmitting array 14 and the feed values. Only the phase variation in the x direction is considered, i.e., the direction of the transmitting array 14.

Figure 3:
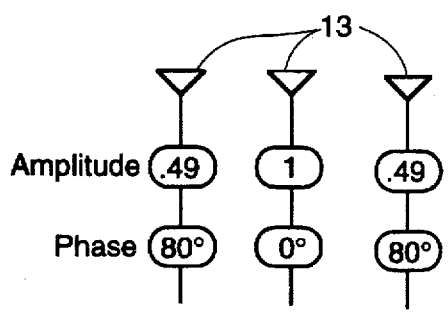
FIG. 3 shows wavefront weighting that provides for a linear wavefront shown in FIG. 2 generated using the present invention.
Figure 4:
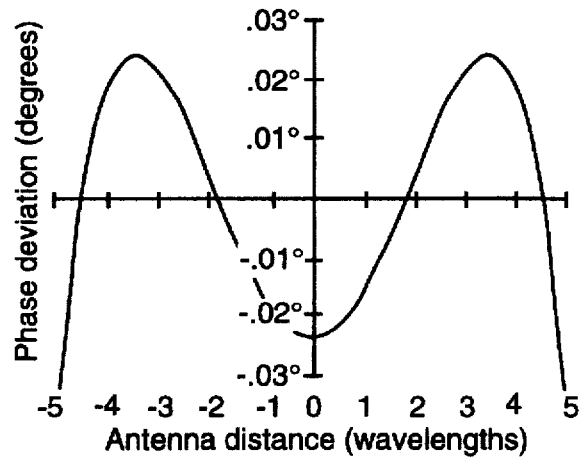
FIG. 4 illustrates an approximation to a linear wavefront of <5° over 10λ with an antenna separation of two feet shown in FIG. 2.

By amplitude and phase weighting the electromagnetic energy signals, the resulting vector summation of three wavefronts 12 derived from the respective transmitting antennas 13 forms a linear phase front across the aperture of the system under test 11. Using three transmitting antennas 13, each separated by two feet, for example, as shown in FIG. 3 together with the phase and amplitude weighting indicated in FIG. 3, the resulting wavefront 12 is shown in FIG. 4. The deviation from linear is less than ±0.03° across the 10 wavelength extent of the aperture of the antenna array 15 of the system under test 11.

Figure 5:
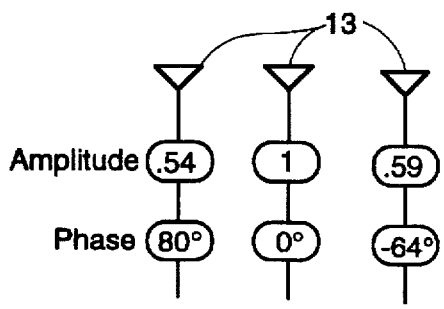
FIG. 5 illustrates wavefront weighting that provides for a line of bearing adjustment to the angle of arrival.
Figure 6:
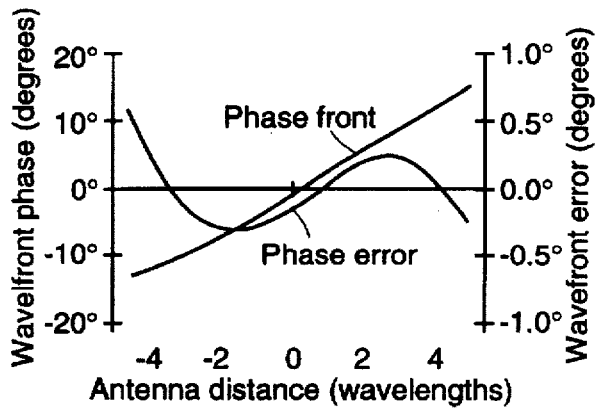
FIG. 6 illustrates a wavefront with an angle of arrival of 0.7° using the present invention.

By changing the phase and amplitude weighting, the linear wavefront 12 may be tilted to represent an antenna position between other antennas arrays 14 positioned around the interior of the test chamber, for example. By taking advantage of this feature, discrete line of bearing values observed in the system under test 11 obtained by sequentially switching between antennas 13 are replaced by smoothed positional data. FIG. 5 shows the transmitter amplitude and phase weighting to accomplish the tilting of the wavefront 12 to represent a line of bearing movement of 0.7 degrees. The resultant wavefront 12 is shown in FIG. 6 together with the error from linearity.

For the purposes of completeness, FIG. 7 is a flow diagram illustrating one method 20 in accordance with the principles of the present invention that generates a plane wave for testing a system under test 11 having an antenna array 15 with a multi-wavelength aperture. The method 20 comprises the following steps.

At least three transmitting antennas 13 are disposed 21 a distance less than 250 feet from the antenna array 15 of the system under test 11. Electromagnetic energy signals are simultaneously radiated 22 from the three transmitting antennas 13. The respective electromagnetic energy signals are amplitude and phase weighted 23 to synthesize a one dimensional linear plane wave of radiation over at least 10 wavelengths (and typically 10 to 20 or more) to produce a combined wavefront having a linear phase front across the aperture of the antenna array 15 of the system under test 11. Additionally, the phase and amplitude weighting may be changed 24 to tilt the linear wavefront made incident upon the antenna array 15 of the system under test 11.

Since the three transmitting antennas 13 are relatively small compared to a large curved billboard array, multiple groups of transmitting antennas 13 may be employed to address multiple antenna arrays 15 on the system under test 11. These groups of transmitting antennas 13 may be configured to address the same and/or many frequency ranges. Also, since these transmitting antennas 13 are nonintrusive to the system under test 11, the EMI is minimum and allows testing at multiple frequencies and/or angular directions at the same time. The effect is to simulate multiple emitter real-world testing at far ranges in the relatively small area of an anechroic chamber.

Thus, a near field planar wavefront generation technique that may be used in electronic test ranges to test precision angle of arrival antenna measurement systems, and that permits multiple tests to be conducted at the same time has been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

1. A method of generating a plane wave that is made incident upon a multi-wavelength aperture of an antenna array of a system under test, said method comprising the steps of:

providing at least three transmitting antennas that are separated by a predetermined distance;

simultaneously radiating electromagnetic energy signals from the transmitting antennas; and amplitude and phase weighting the respective electromagnetic energy signals to synthesize a one dimensional linear plane wave of radiation over at least ten wavelengths to produce a combined wavefront having a linear phase front across the aperture of the antenna array of the system under test.

2. The method of claim 1 wherein the transmitting antennas and the antenna array of the system under test 1 are separated by a distance is of from 100 to 200 feet.

3. The method of claim 1 further comprising:

changing the phase and amplitude weighting to tilt the linear wavefront made incident upon the antenna array of the system under test.

4. The method of claim 3 wherein the transmitting antennas and the antenna array of the system under test are separated by a distance is of from 100 to 200 feet.

* * * * *